(12) United States Patent
Liu et al.

(10) Patent No.: US 8,856,763 B2
(45) Date of Patent: *Oct. 7, 2014

(54) COMPILER OPTIMIZATION BASED ON COLLECTIVITY ANALYSIS

(71) Applicant: International Business Machines Corporation, Armonk, NY (US)

(72) Inventors: Yaxun Liu, Richmond Hill (CA); Ilie G. Tanase, Somers, NY (US); Ettore Tiotto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,983

(22) Filed: Mar. 18, 2014

(65) Prior Publication Data

US 2014/0196018 A1 Jul. 10, 2014

Related U.S. Application Data

(63) Continuation of application No. 13/670,677, filed on Nov. 7, 2012.

(51) Int. Cl.
  *G06F 9/45* (2006.01)
(52) U.S. Cl.
  CPC ..................... *G06F 8/443* (2013.01)
  USPC ........................................................ 717/151
(58) Field of Classification Search
  CPC ....................................................... G06F 8/443
  USPC ........................................................ 717/151
  See application file for complete search history.

(56) References Cited

U.S. PATENT DOCUMENTS

| | | | |
|---|---|---|---|
| 6,986,130 B1 | 1/2006 | Boucher | |
| 7,512,950 B1 | 3/2009 | Marejka | |
| 7,673,295 B1 | 3/2010 | Lin | |
| 7,908,604 B2 | 3/2011 | Takayama et al. | |
| 2005/0028141 A1 | 2/2005 | Kurhekar et al. | |
| 2010/0299656 A1 | 11/2010 | Shah et al. | |
| 2012/0124585 A1 | 5/2012 | Almasi et al. | |

OTHER PUBLICATIONS

UPC Consortium; UPC Language Specificaions V1.2; Section 6.6.1; Lawrence Berkeley National Laboratory; May 31, 2005; pp. 27-29.
Phil Merkey; "UPC Tutorials: upc_barriers;" Michigan Tech Computer Science Dept.website as captured by the Wayback MAchine Internet Archive (archive.org) on Jul. 20, 2011; 2 pages.
Amir Kamil et al.; "Enforcing Textual Alignment of Collectives Using Dynamic Checks*;" Workshops on Languages and Compilers for Parallel Computing (LCPC) 2009; Oct. 8-10, 2009; pp. 368-382.
"Optimizing Applications on the Cray X1(TM) System;" Chapter 8, Optimizing Parallel Code; Cray.com website as captured by the Wayback Machine Internet Archive (archive.org) on Nov. 11, 2011; 5 pages.

(Continued)

*Primary Examiner* — Qing Chen
*Assistant Examiner* — Clint A Thatcher
(74) *Attorney, Agent, or Firm* — Cantor Colburn LLP; Ed Choi (57) ABSTRACT

An embodiment is directed to determining, by a compiler, that a call to a named barrier is matched across all of a plurality of threads, and based at least in part on determining that the call to the named barrier is matched across all of the plurality of threads, replacing, by the compiler, the named barrier with an unnamed barrier.

10 Claims, 5 Drawing Sheets

(56) References Cited

OTHER PUBLICATIONS

IP.com, "Controlling Flow Graph Matching and Differentiation", accessed at http://ip.com/IPCOM/000146588, published Feb. 16, 2007, 2 pages.

Yonezawa, Naoki, et al., "A Probabilistic Analysis of a Barrier Eliminating Algorithm", Communications, Computers and Signal Processing, 2009. PacRim 2009. IEEE Pacific Rim Conference on Aug. 23-26, 2009, 6 pages.

Ziarek, L., et al.; "Speculative N-Way Barriers"; DAMP '09; 2009, pp. 1-12.

FIG. 1

```
1   initialize the statement map so that all statements are
        mapped to a CollectivityInfo with execByAll=0
    initialize the CFG edge map so that all CFG edges are
        mapped to a CollectivityInfo with execByAll=1

5   while (true) {
        for each statement
            update collectivity info of the CFG
        check if there is change in collectivity info for the
        CFG. If no change, exit the loop
10  }
```

FIG. 2

```
1   collectivityInfo info;
    If it is the first statement of a CFG node
        If the predecessor CFG node is the entry node
            info.execByAll = 1;
5       else if all predecessor CFG edges are mapped to
    execByAll=1
            info.execByAll = 1;
        else if all predecessor CFG edges are mapped to the same
    lastNodeByAll and the same barriersSinceLast,
10          if the CFG node post-dominates lastNodeByAll
                info.execByAll = 1;
            else
                info.execByAll = 0;
                update lastNodeByAll and barriersSinceLast of info
15  with values from predecessor CFG edges
        else
            info.execByAll = 0;
        map the current statement to info If this statement is a barrier and info.lastNodeByAll is
20  not 0
        increase info.barriersSinceLast by 1
    else if it is a function call
        if this function is not a standard C library, nor it is
    a function known to be exited by all threads consistently
25          info.execByAll = 0;
```

```
   If this statement is not the last statement of the CFG node
       map the next statement of this CFG node to info
   else if there is only one successor CFG edge to this CFG
   node
       map successor CFG edge to info
   else
       get the expression of the branch condition of the last
30     statement of the CFG node
       if the branch condition depends on thread and info.
   execByAll is 1
           info.execByAll = 0
35         assign the current CFG node index to info.lastNodeByAll
       map all the successor CFG edges to info
```

FIG. 4

COMPILER OPTIMIZATION BASED ON COLLECTIVITY ANALYSIS

CROSS-REFERENCE TO RELATED APPLICATION

This application is a continuation of U.S. patent application Ser. No. 13/670,677, filed Nov. 7, 2012, the disclosure of which is incorporated by reference herein in its entirety.

STATEMENT REGARDING FEDERALLY SPONSORED RESEARCH OR DEVELOPMENT

This invention was made with Government support under Contract Number HR0011-07-9-0002 awarded by DARPA (Defense Advanced Research Projects Agency). The Government has certain rights to this invention.

BACKGROUND

Barrier is a synchronization mechanism in Unified Parallel C (UPC), where UPC is a programming language derived from the C programming language. In UPC, when a thread encounters a barrier, the thread waits at the barrier until all other threads execute the same (or another) barrier statement. Since barriers are used extensively in UPC programs, the runtime performance associated with the execution of a barrier statement has a significant impact on the runtime performance of typical UPC programs.

BRIEF SUMMARY

An embodiment is directed to a method for optimizing a barrier comprising determining, by a compiler, that a call to a named barrier is matched across all of a plurality of threads, and based at least in part on determining that the call to the named barrier is matched across all of the plurality of threads, replacing, by the compiler, the named barrier with an unnamed barrier.

An embodiment is directed to a computer program product comprising a computer readable storage medium having computer readable program code stored thereon that, when executed by a compiler, performs a method for optimizing a barrier, the method comprising determining that a call to a named barrier is matched across all of a plurality of threads, and based at least in part on determining that the call to the named barrier is matched across all of the plurality of threads, replacing the named barrier with an unnamed barrier.

An embodiment is directed to a system comprising a compiler configured to determine that a call to a named barrier is matched across all of a plurality of threads, and based at least in part on determining that the call to the named barrier is matched across all of the plurality of threads, replace the named barrier with an unnamed barrier.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In accordance with various embodiments of the disclosure, an analysis may be performed to determine whether a program statement is executed by a plurality of threads consistently. In some embodiments, a named barrier may be replaced by an unnamed barrier based on the analysis. In some embodiments, an analysis may be performed to determine whether a call to a named barrier is matched across a plurality of threads, such that a determination may be made as to whether an expression is the same across the threads. When the expression is the same, a barrier statement including the expression may be replaced by an unnamed barrier.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Figure 1:
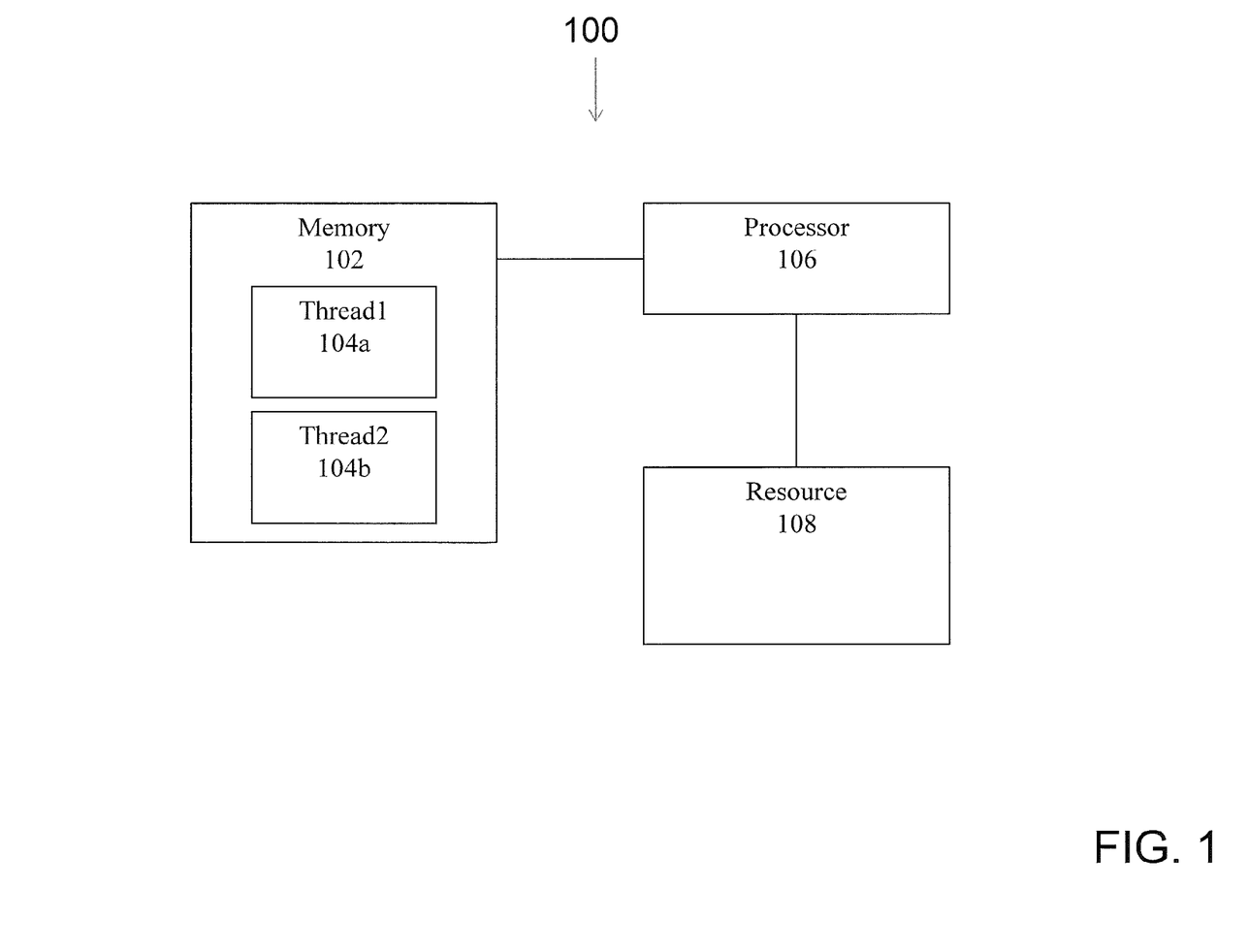
FIG. 1 depicts an exemplary system architecture in accordance with one or more embodiments.

Referring to FIG. 1, an exemplary system architecture 100 is shown. The architecture 100 is shown as including a memory 102. The memory 102 may store executable instructions. The executable instructions may be stored or organized in any manner. As an example, at least a portion of the instructions are shown in FIG. 1 as being associated with a first thread 104a and a second thread 104b, although any number of threads may be included. The instructions stored in the memory 102 may be executed by one or more processors, such as a processor 106.

The threads 104a and 104b may be associated with a resource 108. For example, the resource 108 may include data, which may be organized as one or more blocks, objects, fields, or the like. The threads 104a and 104b may access the resource 108 concurrently (e.g., concurrently in terms of time or space), such that the resource 108 may be, or include, a shared resource.

In some embodiments, access to the resource 108 may be synchronized. For example, in a parallel computing environment, synchronization may be needed to ensure consistency in terms of data or values when the thread 104a engages in a store or write operation with respect to a variable and the thread 104b engages in a read operation of that same variable. Barrier statements may be used to achieve such synchronization.

The Unified Parallel C (UPC) language provides two basic types of barrier statements As used herein, a "named barrier" may take the form:

upc_barrier x;

where x is an expression with type int.

As used herein, an "unnamed barrier" may take the form:

upc_barrier;

Thus, relative to a named barrier, an unnamed barrier does not include an expression. In some instances, named barriers may be used by a programmer during development, debugging, or troubleshooting activities. The named barrier may then be replaced with an unnamed barrier following such activity.

One or more embodiments may incorporate principles of a synchronization phase. A synchronization phase may include all the program statements between the completion of a upc_barrier and the start of the next.

The UPC specification requires an interrupt, in an implementation defined manner (e.g., a diagnostic message) when the value of the expression supplied to a named barrier differs from the value of the expression supplied to a named barrier by any thread in the current synchronization phase. The UPC specification also provides that an unnamed barrier matches any other barrier invocation.

To satisfy the foregoing UPC specification requirement, a UPC runtime library might need to check each barrier invocation to determine whether a barrier expression, if supplied, is the same across the invocation of the barrier by any thread. Such a check adds runtime overhead.

In practice, the majority of barrier statements in a UPC program may be unnamed barriers. Given that unnamed barriers match any other barrier statement, if a compiler can prove or determine that: (1) named barriers are matched and (2) for each execution of a barrier that all threads executed the same number of barrier invocations, an unnamed barrier or an optimized barrier can be used in place of a named barrier or generic barrier, which may save computing resources (e.g., processing resources) at runtime. The second condition described above (that for each execution of a barrier that all threads executed the same number of barrier invocations) may be used to ensure that a barrier is executed by all threads in a synchronous manner.

In some embodiments, a determination may be made whether a upc_barrier invocation at a particular program point can be safely implemented using a specialized runtime call. In order to provide such an implementation, confirmation is needed that all prior barrier invocations are complete, and that all the barrier invocations in the current synchronization phase are either: (1) unnamed barriers, or (2) named barriers with the same expression value. These conditions allow the compiler to prove that the runtime logic used to determine whether a diagnostic message needs to be emitted is unnecessary.

In order to facilitate the compiler's analysis of a program (which may be referred to herein as a "collectivity analysis"), a control flow graph (CFG) may be used. A CFG may correspond to a directed graph with "nodes" and "edges," where a node may correspond to a program statement and an edge may correspond to program flow between statements.

As part of the collectivity analysis, a collectivity property may be used. The collectivity property may identify whether a statement is executed, or a CFG edge is entered, by all threads the same number of times. The collectivity property may be used to prove the legality of a code optimization, such as replacing a generic barrier call with an optimized barrier version that has a lower latency.

The collectivity analysis may be implemented across procedure calls (e.g., as an inter-procedural analysis) since the "main" function may always be entered by all threads consistently and may therefore serve as a starting point of the analysis. The collectivity analysis may be implemented as an intra-procedural analysis, where certain collectivity properties or information may be provided by compiler options or pragmas.

A statement or a CFG edge may be deemed as being "executed by all threads consistently" if, and only if, the following two conditions are satisfied: (1) the statement or the CFG edge is entered by all threads for the same number of times, and (2) before each entering of the statement or the CFG edge, all threads have executed the same number of barriers.

Assumptions may be made to facilitate the collectivity analysis. For example, a function under analysis may be assumed to be entered by all threads consistently. A CFG may be constructed for the function and dominators and post-dominators of each CFG node may be known. Statements of the function may be stored in, e.g., a linked list so that given a first statement the next statement after the first statement can be found or located. The CFG nodes may be indexed and the index may start with, e.g., one (1).

Collectivity properties for all the other functions may be known, such as whether a particular function is entered by all threads consistently and exited by all threads consistently. Such information could be obtained through an inter-procedural analysis, or by compiler command line options or pragmas. If a function corresponds to a standard C library function or a UPC library function, a compiler option may be given to assure that a function with the same name as a standard C library function or UPC library function is truly a standard C library function or UPC library function, such that its internal semantics and their effect on collectivity properties may be known in advance.

To facilitate the collectivity analysis, a structure (which may be referred to herein as "CollectivityInfo") may be used to represent collectivity information about a statement or a CFG edge which contains the following members or elements: (1) execByAll, (2) lastNodeByAll, and (3) barriersSinceLast.

execByAll may correspond to a parameter or flag that may indicate whether a statement or CFG edge is entered by all threads consistently. A value of, e.g., '1' may indicate that the statement or CFG edge is entered by all threads consistently and a value of '0' may indicate otherwise.

lastNodeByAll may correspond to an index for the last CFG node which is exited by all threads consistently before entering this statement or CFG edge. A value of, e.g., '0' may indicate that such a node does not exist. A value other than '0', such as a positive value, may indicate that the corresponding CFG node is exited by all threads consistently, and all the paths from that CFG node to a current CFG node or CFG edge contain the same number of barriers.

barriersSinceLast may correspond to a value (e.g., an integer value) equal to the number of barriers contained in the paths from the CFG node with index lastNodeByAll to the current CFG node or edge, if lastNodeByAll is not '0'.

In some embodiments, two types of tables (e.g., two hash tables) may be created for the collectivity analysis. A first of the tables may be used to map a statement to collectivity information and a second of the tables may be used to map a CFG edge to collectivity information. Pseudo code is provided in FIG. 2. The first four lines of code (lines 1-4) in FIG. 2 may serve to initialize the tables or maps. Lines 5-10, corresponding to a loop such as a while lop, may serve to propagate collectivity information across the CFG until no changes to the collectivity information are present or detected.

Figure 3A:
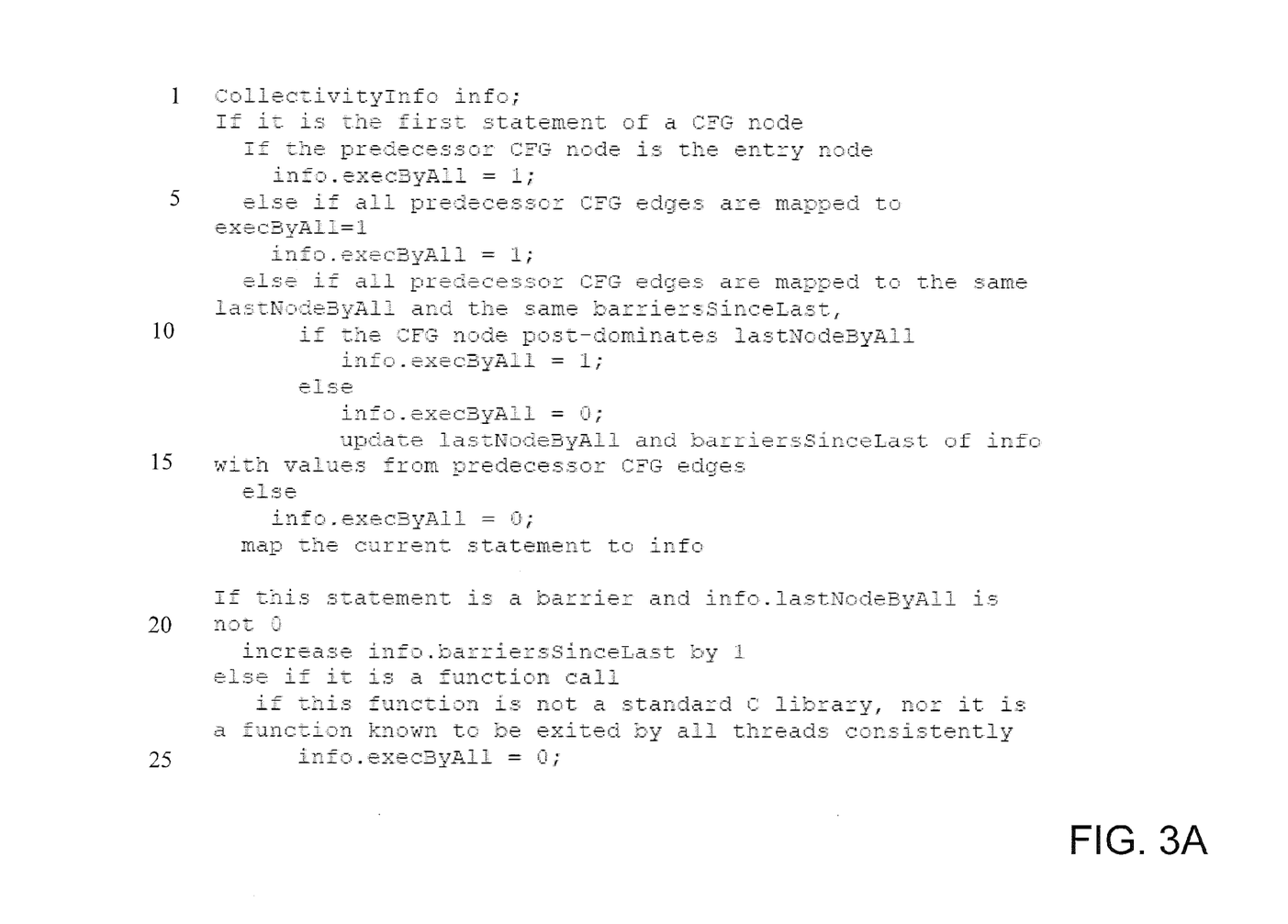
FIG. 3A depicts exemplary code in accordance with one or more embodiments.
Figure 3B:
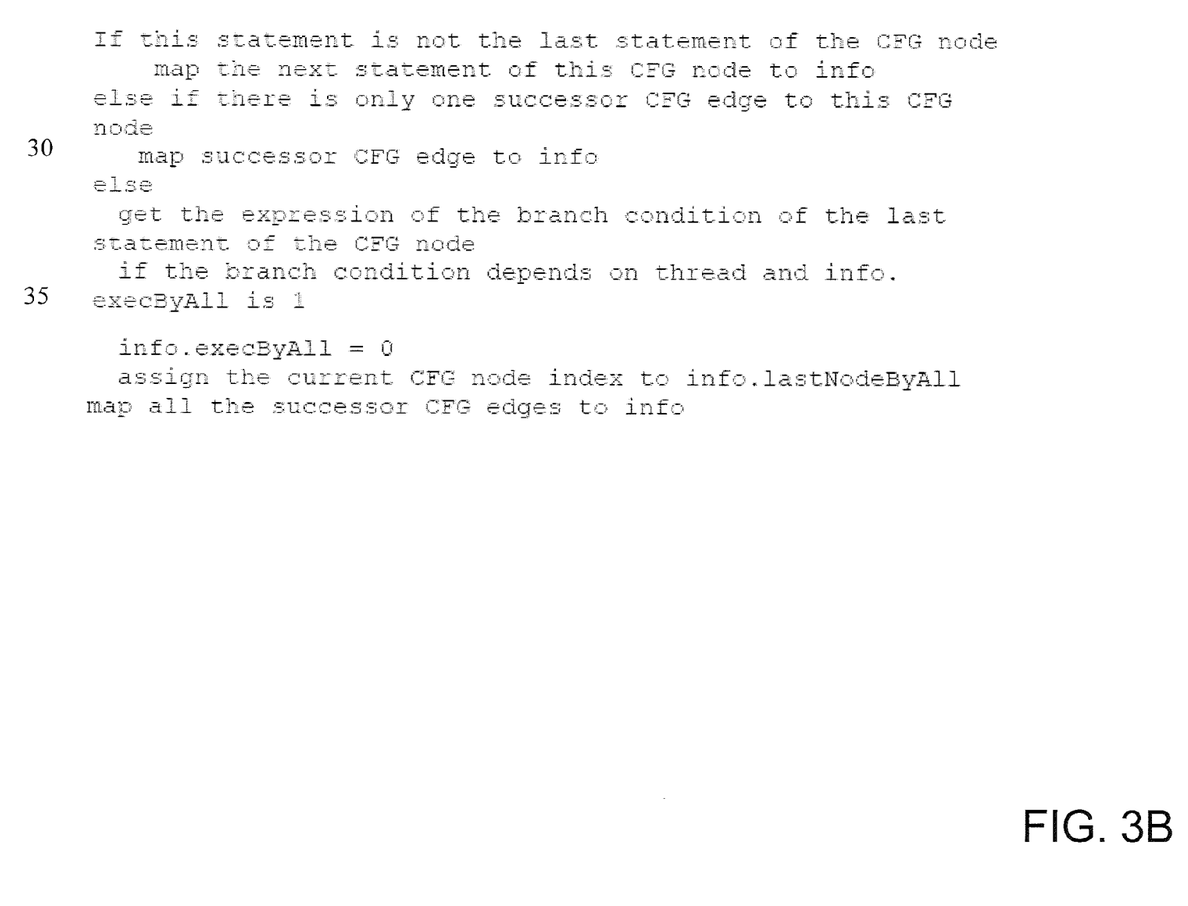
FIG. 3B depicts exemplary code in accordance with one or more embodiments.

FIGS. 3A-3B (collectively referred to herein as FIG. 3) illustrate a procedure that may be used to update the statement map and CFG map for each statement. As shown, the procedure of FIG. 3 may implement the collectivity analysis by checking for various conditions that are the subject of the "if" and "else if" tests or checks provided therein.

Figure 2:
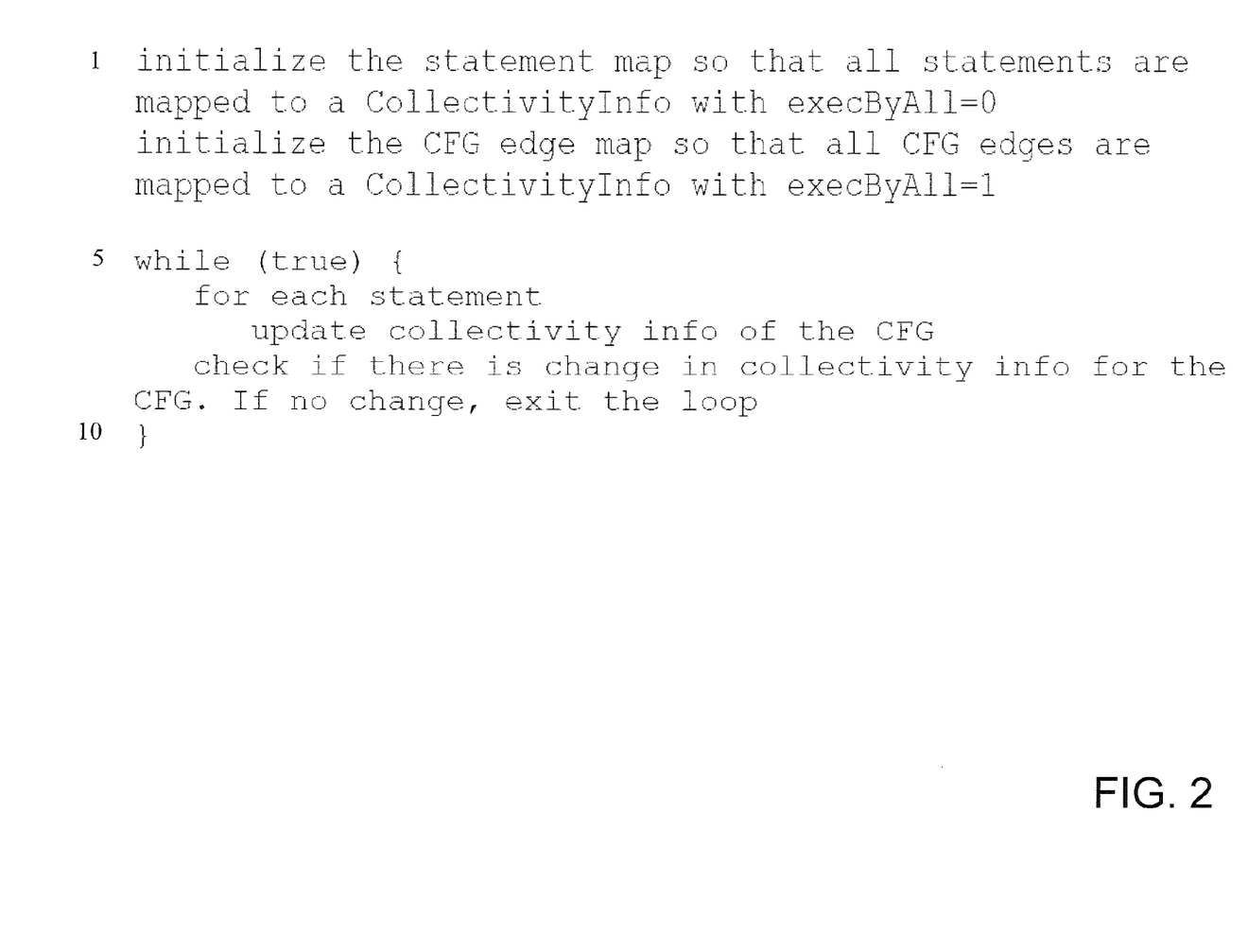
FIG. 2 depicts exemplary code in accordance with one or more embodiments.

The code illustrated in FIGS. 2 and 3 is illustrative. In some embodiments, an actual implementation of the code may differ from what is shown. In some embodiments, some of the code may be optional or execute in an order or sequence different from what is shown. In some embodiments, additional code not shown may be included.

Figure 4:
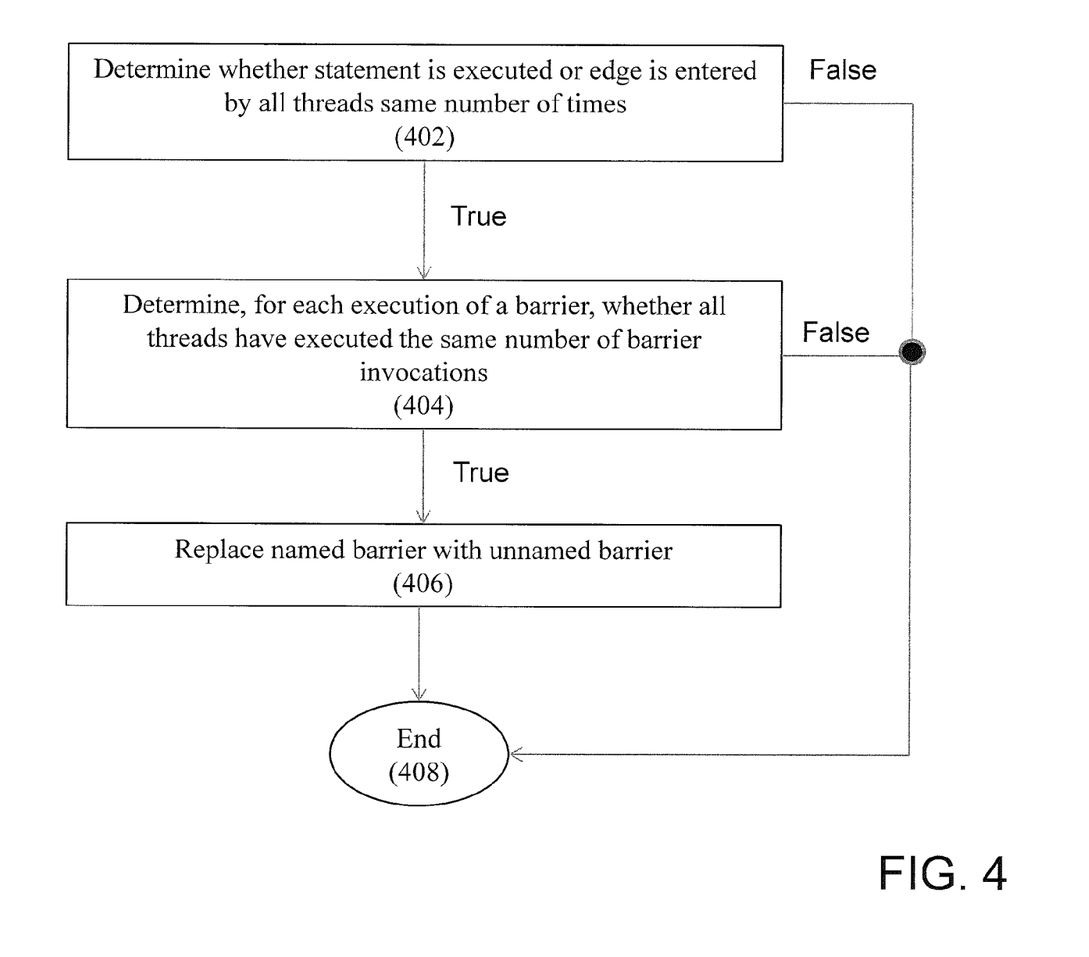
FIG. 4 depicts a flow chart of an exemplary method in accordance with one or more embodiments.

FIG. 4 illustrates a flow chart of a method that may be used in accordance with one or more embodiments. The method may be used or executed by a compiler to determine when a named barrier can be replaced by an unnamed barrier that does not require a semantic check at runtime.

In block 402, a determination may be made whether a statement is executed, or a CFG edge is entered, by all threads the same number of times. If not, flow may proceed along the "False" path out of block 402 to "End" 408, such that the named barrier may be retained. Otherwise, if the statement is executed, or the CFG edge is entered, by all threads the same number of times flow may proceed along the "True" path out of block 402 to block 404.

In block 404, a determination may be made, for each execution of a barrier, whether all threads have executed the same number of barrier invocations. If not, flow may proceed along the "False" path out of block 404 to "End" 408, such that the named barrier may be retained. Otherwise, flow may proceed along the "True" path out of block 404 to block 406.

In block 406, a named barrier may be replaced with an unnamed barrier, given that both tests or checks associated with blocks 402 and 404 returned a "True" result.

The method of FIG. 4 is illustrative. In some embodiments, one or more of the blocks or operations may be optional. In some embodiments, one or more additional operations not shown may be included. In some embodiments, the operation may execute in an order or sequence different from what is shown in FIG. 4.

Aspects of the disclosure may be implemented independent of a specific instruction set (e.g., CPU instruction set architecture), operating system, or programming language. Aspects of the disclosure may be implemented in conjunction with non-transactional machine instructions. Aspects of the disclosure may be implemented in connection with thread-level speculation, which may be similar to HTM.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or an embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more data structures, metadata, etc.

Embodiments of the disclosure may be tied to particular machines. For example, in some embodiments one or more devices may allocate or manage resources, such as HTM resources. In some embodiments, the one or more devices may include a computing device, such as a personal computer, a laptop computer, a mobile device (e.g., a smartphones), a server, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. A method for optimizing a barrier comprising: determining, by a compiler, that a call to a named barrier is matched across all of a plurality of threads; and based at least in part on determining that the call to the named barrier is matched across all of the plurality of threads, replacing, by the compiler, the named barrier with an unnamed barrier.

2. The method of claim 1, further comprising: determining, by the compiler, that the named barrier is executed by all of the plurality of threads consistently.

3. The method of claim 2, wherein determining that the named barrier is executed by all of the plurality of threads consistently comprises: determining, by the compiler, that the named barrier is entered by all of the plurality of threads the same number of times; and determining, by the compiler, that all of the plurality of threads have executed the same number of barriers before entering the named barrier.

4. The method of claim 1, wherein the named barrier and the unnamed barrier are associated with a Unified Parallel C (UPC) program.

5. The method of claim 4, further comprising: executing, by a plurality of parallel computing devices, the UPC program.

6. A computer program product comprising a non-transitory computer readable storage medium having computer readable program code stored thereon that, when executed by a compiler, performs a method for optimizing a barrier, the method comprising: determining that a call to a named barrier is matched across all of a plurality of threads; and based at least in part on determining that the call to the named barrier is matched across all of the plurality of threads, replacing the named barrier with an unnamed barrier.

7. The computer program product of claim 6, wherein the method further comprises: determining that the named barrier is executed by all of the plurality of threads consistently.

8. The computer program product of claim 7, wherein determining that the named barrier is executed by all of the plurality of threads consistently comprises: determining that the named barrier is entered by all of the plurality of threads the same number of times; and determining that all of the plurality of threads have executed the same number of barriers before entering the named barrier.

9. The computer program product of claim 6, wherein the named barrier and the unnamed barrier are associated with a Unified Parallel C (UPC) program.

10. The computer program product of claim 6, wherein determining that the call to the named barrier is matched across all of the plurality of threads comprises determining that an expression included in the named barrier is common across all of the plurality of threads.

* * * * *